United States Patent
Aggarwal et al.

(10) Patent No.: US 11,853,917 B2
(45) Date of Patent: Dec. 26, 2023

(54) RETAIL PRODUCT ASSORTMENT GENERATION AND RECOMMENDATION

(71) Applicant: International Business Machines Corporation, Armonk, NY (US)

(72) Inventors: Nupur Aggarwal, Bangalore (IN); Abhishek Bansal, New Delhi (IN); Kedar Kulkarni, Bangalore (IN); Kushagra Manglik, Lucknow (IN); Vikas C. Raykar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/002,400

(22) Filed: Aug. 25, 2020

(65) Prior Publication Data
US 2022/0067610 A1 Mar. 3, 2022

(51) Int. Cl.
| | |
|---|---|
| *G06Q 10/0631* | (2023.01) |
| *G06Q 30/0202* | (2023.01) |
| *G06N 3/08* | (2023.01) |
| *G06Q 10/087* | (2023.01) |
| *G06N 3/04* | (2023.01) |

(52) U.S. Cl.
CPC ......... *G06Q 10/06315* (2013.01); *G06N 3/04* (2013.01); *G06N 3/08* (2013.01); *G06Q 10/087* (2013.01); *G06Q 30/0202* (2013.01)

(58) Field of Classification Search
None
See application file for complete search history.

(56) References Cited

U.S. PATENT DOCUMENTS

| | | | |
|---|---|---|---|
| 8,725,594 B1 * | 5/2014 | Davies | G06Q 10/06 705/28 |
| 10,275,819 B1 * | 4/2019 | Johnson | G06N 5/022 |
| 10,496,938 B2 | 12/2019 | Desai et al. | |
| 10,552,792 B2 * | 2/2020 | Mattingly | G06Q 10/0631 |

(Continued)

OTHER PUBLICATIONS

Sinha, A., Sahgal, A., Marthur, S., Category Optimizer: A Dynamic-Assortment, New-Product-Introduction, MixOptimization, and Demand-Planning System, Apr. 2013, Marketing Science , Mar.-Apr. 2013, vol. 32, No. 2 (Mar.-Apr. 2013), pp. 221-228 (Year: 2013).*

(Continued)

*Primary Examiner* — Sara Grace Brown
(74) *Attorney, Agent, or Firm* — L. Jeffrey Kelly

(57) ABSTRACT

One embodiment provides a method, including: receiving information for each of a plurality of products; for each of the plurality of products: predicting a demand for the product; calculating a sustainability score, wherein the sustainability score is based upon a material composition of the product; and computing a similarity score, wherein the computing comprises comparing pairs of products within the plurality of products; generating a plurality of assortment choices from the plurality of products, wherein each of the plurality of assortment choices has a corresponding assortment demand value, assortment sustainability score, and assortment similarity score, wherein the generating comprises utilizing a multi-objective formulation based upon the predicted demand, the calculated sustainability score, and the computed similarity score; and providing the plurality of assortment choices to a user for selection.

18 Claims, 6 Drawing Sheets

(56) References Cited

U.S. PATENT DOCUMENTS

| | | | |
|---|---|---|---|
| 10,614,504 B2* | 4/2020 | Wilkinson | G06Q 30/0255 |
| 2007/0094067 A1* | 4/2007 | Kumar | G06Q 30/0201 |
| | | | 705/26.2 |
| 2010/0030601 A1* | 2/2010 | Warther | G06Q 30/02 |
| | | | 705/7.41 |
| 2010/0145773 A1* | 6/2010 | Desai | G06Q 30/0264 |
| | | | 705/7.29 |
| 2012/0123953 A1* | 5/2012 | Jabara | G06Q 30/018 |
| | | | 705/317 |
| 2012/0284084 A1* | 11/2012 | Popkov | G06Q 10/04 |
| | | | 705/7.31 |
| 2013/0185104 A1* | 7/2013 | Klavins | G06Q 10/063 |
| | | | 705/7.12 |
| 2015/0134413 A1* | 5/2015 | Deshpande | G06Q 30/0205 |
| | | | 705/7.31 |
| 2015/0332295 A1* | 11/2015 | Unser | G06Q 40/08 |
| | | | 705/7.31 |
| 2016/0140643 A1* | 5/2016 | Nice | G06F 16/3344 |
| | | | 705/26.7 |
| 2016/0307146 A1* | 10/2016 | Nanda | G06Q 10/04 |
| 2017/0278111 A1* | 9/2017 | Gerard | G06Q 30/0201 |
| 2018/0308030 A1* | 10/2018 | Nemati | G06Q 10/06314 |
| 2019/0213509 A1* | 7/2019 | Burleson | G06N 20/00 |
| 2019/0236652 A1* | 8/2019 | Kaul | G06Q 30/0255 |
| 2019/0370879 A1* | 12/2019 | Bhattacharjee | G06N 3/045 |
| 2020/0184494 A1* | 6/2020 | Joseph | G06K 9/6256 |
| 2020/0258094 A1* | 8/2020 | Abrams | G06Q 30/018 |
| 2020/0265446 A1* | 8/2020 | Vargas | G06K 7/10297 |
| 2020/0394697 A1* | 12/2020 | Paolella | G06Q 30/0623 |
| 2021/0110324 A1* | 4/2021 | Charraud | G06Q 10/06395 |
| 2021/0166179 A1* | 6/2021 | Pande | G06N 3/04 |
| 2021/0334830 A1* | 10/2021 | Lei | G06K 9/6223 |
| 2021/0342701 A1* | 11/2021 | Ayush | G06V 10/82 |

OTHER PUBLICATIONS

Rooderker, R., van Heerde, H., Bijmolt, T., Optimizing Retail Assortments, 2013, Marketing Science, Sep.-Oct. 2013, vol. 32, No. 5 (Sep.-Oct. 2013), pp. 699-715 (Year: 2013).*

Bhattacharya, Indrani, Arkabandhu Chowdhury, and Vikas C. Raykar. "Multimodal dialog for browsing large visual catalogs using exploration-exploitation paradigm in a joint embedding space." Jun. 13, 2019. Proceedings of the 2019 on International Conference on Multimedia Retrieval. 2019. (Year: 2019).*

Ashayeri, Jalal, Ning Ma, and Renata Sotirov. "Supply chain network downsizing with product line pruning using a new demand substitution." Oct. 2015. Journal of the Operational Research Society 66.10 (2015): 1699-1716. (Year: 2015).*

Christopher M. Miller et al., "Optimizing and Evaluating Retail Assortments for Infrequently Purchased Products", Journal of Retailing, 2010, 13 pages, Elsevier.

Disclosed Anonymously, "Leveraging AI to Predict Retail Inventory Stockouts", ip.com Prior Art Database Technical Disclosure, ip.com No. IPCOM000261774D, Apr. 2, 2020, 4 pages, ip.com.

Vivek F. Farias et al., "Building Optimized and Hyperlocal Product Assortments: A Nonparametric Choice Approach", SSRN, Jan. 25, 2017, 35 pages, available at: https://ssrn.com/abstract=2905381.

Rebecca Gibson, "The importance of planning ahead for retail success", Technology Record, Dec. 4, 2017, 7 pages, available at: http://www.technologyrecord.com/Magazine/The-Record/Autumn-2017.

P. Senthil Kumar et al., "New Tools and Techniques for Measuring Sustainability in Clothing", Sustainable Innovations in Apparel Production, Textile Science and Clothing Technology, 2018, 23 pages, Springer Nature Singapore Pte Ltd.

Erica Van Herpen et al., "How to position 'mildly sustainable' products: The joint impact of assortment display and price setting", Food Quality and Preference, 2015, 7 pages, Elsevier.

Maria Kalleitner-Huber et al., "How to shift 100,000 products toward sustainability: creating a sustainable assortment at Haberkorn", Clean Techn Environ Policy, Oct. 7, 2012, 6 pages, Springer-Verlag Berlin Heidelberg.

Dianne Hofenk et al., "How and When Retailers' Sustainability Efforts Translate into Positive Consumer Responses: The Interplay Between Personal and Social Factors", J Bus Ethics, 2019, 20 pages, Springer.

Zalando Corporate, "Zalando Grows Its More Sustainable Assortment to over 20,000 Articles", Oct. 29, 2019, 9 pages, available at: https://corporate.zalando.com/en/newsroom/en/news-stories/zalando-grows-its-more-sustainable-assortment-over-20000-articles.

Analyse Blog, "Assortment optimization plays an important role in sustainable retailing", Dec. 27, 2019, 6 pages, available at: https://analyse2.com/2019/12/assortment-optimization-plays-an-important-role-in-sustainable-retailing/.

Olga Chkanikova et al., "Overview of sustainability initiatives in European food retail sector", International Institute for Industrial Environmental Economics, 2011, 41 pages, Lund University.

E.L. Umpfenbach et al., "Promoting sustainability of automotive products through strategic assortment planning", European Journal of Operational Research, 2017, 14 pages, Elsevier.

* cited by examiner

|  | Store 1 | Store 2 | Store 3 | Store 4 | Store 5 | Store 6 |
|---|---|---|---|---|---|---|
| Product 1 | X | 0.32 | X | 0.64 | X | X |
| Product 2 | 0.14 | X | X | X | 0.76 | X |
| Product 3 | X | 0.83 | X | X | X | 0.88 |
| Product 4 | 0.91 | X | X | 0.54 | X | X |
| Product 5 | X | X | 0.43 | X | X | 0.86 |

FIG. 2A

| | Lat 1 | Lat 2 | Lat 3 | Lat 4 |
|---|---|---|---|---|
| Store 1 | 0.2 | 0.3 | 0.1 | 0.6 |
| Store 2 | 0.1 | 0.4 | 0.3 | 0.2 |
| Store 3 | 0.6 | 0.8 | 0.7 | 0.3 |
| Store 4 | 0.9 | 0.6 | 0.1 | 0.5 |
| Store 5 | 0.3 | 0.3 | 0.4 | 0.8 |
| Store 6 | 0.2 | 0.7 | 0.6 | 0.1 |

FIG. 2C

| | Lat 1 | Lat 2 | Lat 3 | Lat 4 |
|---|---|---|---|---|
| Product 1 | 0.2 | 0.3 | 0.1 | 0.6 |
| Product 2 | 0.1 | 0.4 | 0.3 | 0.2 |
| Product 3 | 0.6 | 0.8 | 0.7 | 0.3 |
| Product 4 | 0.9 | 0.6 | 0.1 | 0.5 |
| Product 5 | 0.3 | 0.3 | 0.4 | 0.8 |

FIG. 2B

|           | Store 1 | Store 2 | Store 3 | Store 4 | Store 5 | Store 6 |
|-----------|---------|---------|---------|---------|---------|---------|
| Product 1 | 0.24    | 0.32    | 0.17    | 0.64    | 0.59    | 0.66    |
| Product 2 | 0.14    | 0.43    | 0.72    | 0.11    | 0.76    | 0.23    |
| Product 3 | 0.87    | 0.83    | 0.86    | 0.51    | 0.41    | 0.88    |
| Product 4 | 0.91    | 0.34    | 0.67    | 0.54    | 0.77    | 0.12    |
| Product 5 | 0.33    | 0.11    | 0.43    | 0.91    | 0.44    | 0.86    |

RETAIL PRODUCT ASSORTMENT GENERATION AND RECOMMENDATION

BACKGROUND

People use fashion to express their individual style and personality. Accordingly, there are many different designs and styles of different articles of clothing (e.g., shirts, skirts, pants, shorts, hats, etc.). Additionally, the articles of clothing may be made with different materials (e.g., cotton, polyester, satin, wool, etc.), have different elements (e.g., bows, flowers, knots, zippers, strings, etc.), and the like. Some of the characteristics of the articles of clothing (e.g., fabric type, element size, fabric color, clothing style, fabric design, etc.) may be more favorable in different areas, for example, different geographical regions, different neighborhoods, different climates, and the like. Items that are more favorably received in a retail store provide increased revenue to the store as opposed to those items that are not favorably received.

However, the retail industry is largely considered to be one of the most polluting industries in the world. Specifically, each article of clothing has an environmental cost to produce, transport, and ultimately provide for sale in a retail store. For example, the article of clothing requires raw materials to create, where the raw materials have an environmental cost to grow, manufacture, or otherwise produce. The raw materials then have to be manipulated to be turned into the finished article of clothing. To reduce the environmental impact that the fashion industry has on the world, it is desirable to produce articles of clothing that are sustainable, but many of the sustainability measures come at a cost to the retail store, thereby providing a disincentive for the store to fully embrace the sustainability measures.

BRIEF SUMMARY

In summary, one aspect of the invention provides a method, comprising: receiving information for each of a plurality of products for possible sale at a retail store; for each of the plurality of products: predicting a demand for the product if included within the retail store for sale; calculating a sustainability score, wherein the sustainability score is based upon a material composition of the product; and computing a similarity score, wherein the computing comprises comparing pairs of products within the plurality of products, wherein one of the products within each of the pairs is the product; generating a plurality of assortment choices from the plurality of products, wherein each of the plurality of assortment choices comprises a subset of the plurality of products and has a corresponding assortment demand value, assortment sustainability score, and assortment similarity score, wherein the generating comprises utilizing a multi-objective formulation based upon the predicted demand for each of the plurality of products, the calculated sustainability score for each of the plurality of products, and the computed similarity score for each of the plurality of products; and providing the plurality of assortment choices to a user for selection of one of the plurality of assortment choices to be included within the retail store for sale.

Another aspect of the invention provides an apparatus, comprising: at least one processor; and a computer readable storage medium having computer readable program code embodied therewith and executable by the at least one processor, the computer readable program code comprising: computer readable program code configured to receive information for each of a plurality of products for possible sale at a retail store; for each of the plurality of products: computer readable program code configured to predict a demand for the product if included within the retail store for sale; computer readable program code configured to calculate a sustainability score, wherein the sustainability score is based upon a material composition of the product; and computer readable program code configured to compute a similarity score, wherein the computing comprises comparing pairs of products within the plurality of products, wherein one of the products within each of the pairs is the product; computer readable program code configured to generate a plurality of assortment choices from the plurality of products, wherein each of the plurality of assortment choices comprises a subset of the plurality of products and has a corresponding assortment demand value, assortment sustainability score, and assortment similarity score, wherein the generating comprises utilizing a multi-objective formulation based upon the predicted demand for each of the plurality of products, the calculated sustainability score for each of the plurality of products, and the computed similarity score for each of the plurality of products; and computer readable program code configured to provide the plurality of assortment choices to a user for selection of one of the plurality of assortment choices to be included within the retail store for sale.

An additional aspect of the invention provides a computer program product, comprising: a computer readable storage medium having computer readable program code embodied therewith, the computer readable program code executable by a processor and comprising: computer readable program code configured to receive information for each of a plurality of products for possible sale at a retail store; for each of the plurality of products: computer readable program code configured to predict a demand for the product if included within the retail store for sale; computer readable program code configured to calculate a sustainability score, wherein the sustainability score is based upon a material composition of the product; and computer readable program code configured to compute a similarity score, wherein the computing comprises comparing pairs of products within the plurality of products, wherein one of the products within each of the pairs is the product; computer readable program code configured to generate a plurality of assortment choices from the plurality of products, wherein each of the plurality of assortment choices comprises a subset of the plurality of products and has a corresponding assortment demand value, assortment sustainability score, and assortment similarity score, wherein the generating comprises utilizing a multi-objective formulation based upon the predicted demand for each of the plurality of products, the calculated sustainability score for each of the plurality of products, and the computed similarity score for each of the plurality of products; and computer readable program code configured to provide the plurality of assortment choices to a user for selection of one of the plurality of assortment choices to be included within the retail store for sale.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

BRIEF DESCRIPTION OF THE SEVERAL VIEWS OF THE DRAWINGS

FIG. 2A illustrates a matrix factorization for a product having historical sales information for some retail stores.

FIG. 2B illustrates a latent feature matrix for products.

FIG. 2C illustrates a latent feature matrix for stores.

FIG. 2D illustrates a completed matrix generated from the latent feature matrix for products and the latent feature matrix for stores.

DETAILED DESCRIPTION

Figure 1:
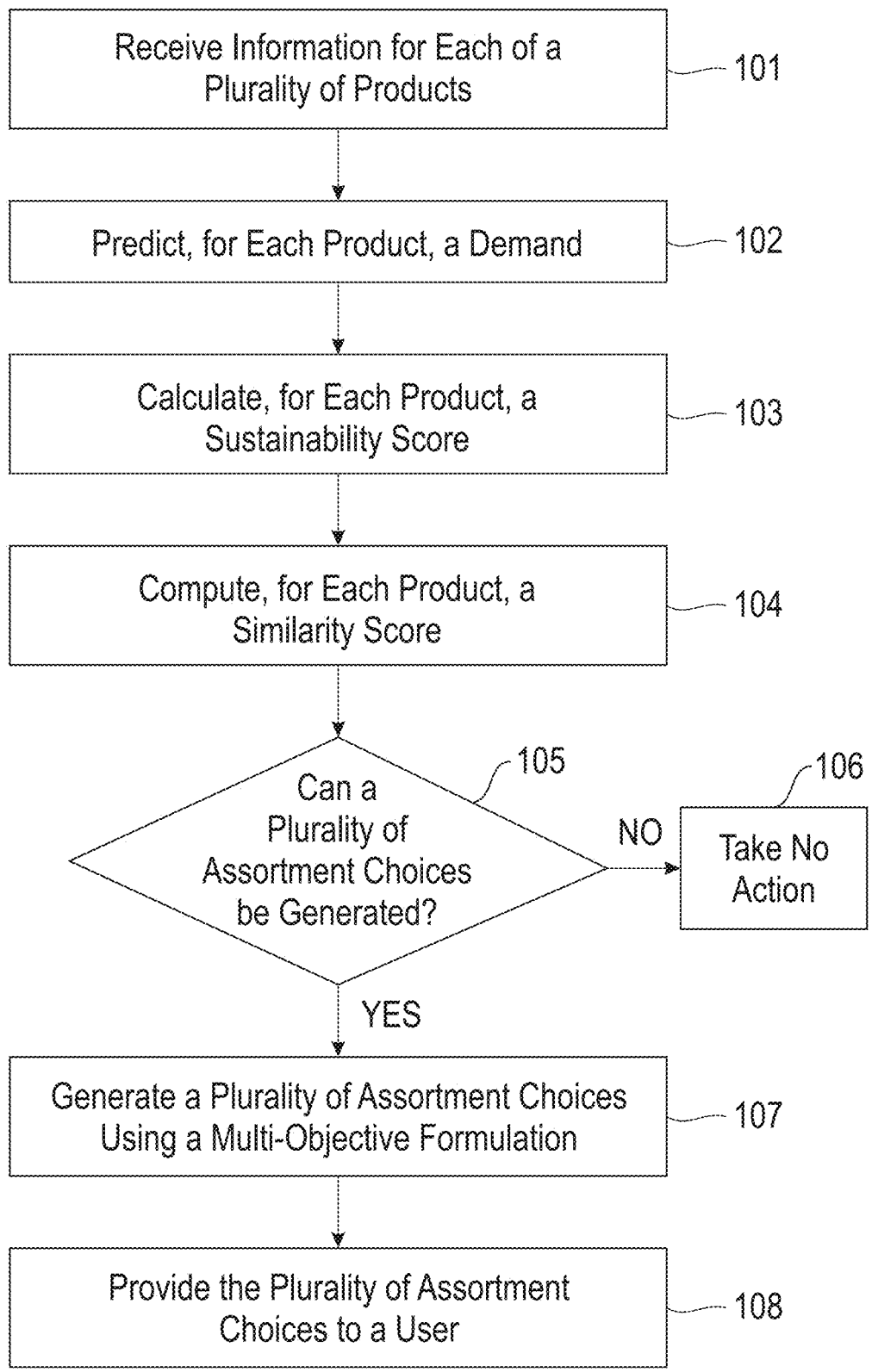
FIG. 1 illustrates a method of generating a plurality of assortments of products for possible sale in a retail store utilizing a multi-objective formulation based upon a demand, sustainability score, and similarity score for each of a plurality of products.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-4. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 4. In accordance with an example embodiment, most if not all of the process steps, components and outputs discussed with respect to FIGS. 1-3 can be performed or utilized by way of a processing unit or units and system memory such as those indicated, respectively, at 16' and 28' in FIG. 4, whether on a server computer, a client computer, a node computer in a distributed network, or any combination thereof.

The fashion industry is under increasing pressure to increase sustainability in the industry. However, there is a belief that in order to follow sustainability measures, a significant increase in costs will be seen. Some measures that have been taken in the industry include decisions in the supply chain that lead to a decrease in the global impact. For example, decisions are made related to the location and capacity of manufacturing facilities that assist in decreasing the environmental impact. As another example, decisions are made regarding scheduling, for example, scheduling shipments so that the emissions from the vehicles transporting the shipments can be reduced. As another example, decisions are made regarding the inventory that is carried within a retail store.

Based upon historical data the retail store may try to guess how many of each item to carry within the store. Reducing the amount of leftovers or unsold items assists in decreasing the environmental impact. However, in order to not affect the revenues of the store, the store needs to carry items that will appeal to the customers that shop within the store. The conventional technique of essentially guessing what will sell, is highly inaccurate and assists in leading to an increased environmental impact. The inventory control people typically look at historical data to assist in determining if an article of clothing will sell. However, some articles of clothing may not have any historical data. Additionally, not all articles of clothing maintain popularity. Finally, articles of clothing that sell well in one retail store may not sell well in a different retail store. Thus, the conventional techniques are highly inaccurate, lead to an increase in unsold or discarded inventory, and ultimately lead to an increased environmental impact.

Accordingly, an embodiment provides a system and method for generating a plurality of assortments of products for possible sale in a retail store utilizing a multi-objective formulation based upon a demand, sustainability score, and similarity score for each of a plurality of products. The system receives information (e.g., images, text, metadata, etc.) for each of a plurality of items or products that may be sold in a retail store. For each of the products individually the system predicts a demand for the product if it were placed within the retail store for sale, calculates a sustainability score, and computes a similarity score. The system is able to predict demand for a product even if it has limited sales history or no sales history at all. The sustainability score is based upon the material composition of the product. The similarity score is computed for pair-wise products, meaning that a product is compared to other products within the plurality of products and a similarity score is computed to for each pair of products.

From the demand value, sustainability score, and similarity score of each of the products, the system can generate multiple assortment choices from the plurality of products, where each assortment contains a subset of the plurality of products. To create each assortment the system utilizes a multi-objective formulation to maximize revenue which is based upon the demand values, maximize sustainability which is based upon the sustainability scores, and maximize diversity which is based upon the similarity score. Such a multi-objective formulation does not have a single solution, thereby resulting in the plurality of assortments instead of just a single assortment. Each assortment can also be assigned an assortment demand value, assortment sustainability score, and assortment similarity score. Once the assortments are created, the assortments can be provided to a user for selection of one of the assortments to be included in the retail store for sale. By utilizing one of the assortment choices, the user can be assured that sustainability can be increased with little to no impact on the revenue of the store.

Such a system provides a technical improvement over current systems for identifying product assortment for sale in a retail store. The described system and method allows companies to be more sustainable while not increasing costs related to increasing sustainability. The described system and method calculates a revenue, sustainability, and similarity score for each of the items that could be provided for sale within a store. Using these scores, the system is able to create assortments for selection by a store that maximize revenue, maximize sustainability, and maximize diversity among the products within each assortment.

Not only does the system identify products that will have an associated demand within the store, which leads to sales of the products and reduces waste of unsold or discarded articles of clothing, but the system is able to assign each product a sustainability score that allows for a decrease in the environmental impact of the fashion industry. Thus, the described system and method provides a technique for selecting products to be sold in a retail store that results in more accurate product selections, meaning the products are more likely to sell, and decreasing the environmental impact of the fashion industry as compared to conventional techniques. Additionally, conventional techniques are unable to be as accurate in product selection as the described technique because conventional techniques cannot utilize some of the elements of the described system because those elements are necessarily rooted in and achievable via computer technology, for example, but not limited to, the use of matrix factorization, the use of a multi-objective formulation, and the training, creation, and use of deep-learning models.

FIG. 1 illustrates a method for generating a plurality of assortments of products for possible sale in a retail store utilizing a multi-objective formulation based upon a demand, sustainability score, and similarity score for each of a plurality of products. At 101 the system receives information for each of a plurality of products for possible sale at a retail store. The plurality of products may include a catalog or other type of database of products that can be selected for sale at the retail store. The catalog or other type of database may be a digital catalog/database, paper catalog/database, or the like. The catalog/database may include many different types of articles of clothing in many different styles and generally includes more products than the retail store will actually select to be placed within the store for sale.

The information may include images of the products, text associated with the products, metadata associated with the products, or the like. For example, a fashion designer may provide an image of a new article of clothing and text that describe different features or characteristics of the article of clothing, for example, the material composition, any features or elements, or the like. Additionally, metadata from the image may be captured, for example, a date of the image, tags (e.g., social media tags, description tags, user provided information, etc.) from the image, a location the image was captured, and the like. As another example, an article in a magazine may describe new fashion trends and metadata associated with the magazine may be obtained, for example, the publication date, geographical region of publication, and the like.

To receive the information a user may manually provide the information to the system, for example, by uploading or scanning the information into the system. As another example, the user may provide a link or pointer to a digital location from which the system can access the information. The system may also obtain the information automatically, for example, by accessing the catalog/database, accessing a location where the information is stored, or the like. In other words, receipt of the information can be via any number of possible techniques for obtaining information.

For each of the plurality of products that could be placed for sale in the retail store, the system predicts a demand for the product if included within the retail store for sale at 102, calculates a sustainability score for a product based upon the material composition of the product at 103, and computes a similarity score for each product at 104. The demand for a product is predicted for a particular store. In other words, the demand is a hyper-local demand forecast. If the product could be placed for sale in multiple stores, the system predicts the demand for the product for each store individually. To predict the demand for the product at 102, the system determines whether the product is a new product or a product that has at least some historical sales. The historical sales do not necessarily need to be sales within the target retail store. Rather, the system can utilize historical sales from other stores other than the target retail store.

In the case that the product is a product that has at least some historical sales information from at least one store other than the target store, the system utilizes a matrix factorization technique to estimate the demand for the product within the target retail store based upon the demand for the product in the other retail store(s). In a matrix factorization technique, a matrix of products across stores is defined. An example matrix is illustrated in FIG. 2A. Each column represents a different store and each row represents a different product. It should be understood that this is merely illustrative and the matrix may include greater or fewer rows and/or columns, may be laid out differently, or the like. If the store has not historically sold a product, an "X" is placed in the box corresponding to the store and product, for example, as shown at 201. It should be understood that other techniques for indicating no sales can be utilized, for example, a number value, a symbol, a word, or the like. For stores that have sold the product, a value is included in the box corresponding to the store and product, for example, as shown at 202. In this illustrative example, the values are displayed within a scale of 0 to 1. Other scales, normalizations, ratios, or the like, may be utilized.

Once the matrix is completed for the products and stores, the system can use this matrix to predict the demand for the product if it would have been sold in stores that did not actually sell the product. From the initial matrix, the system generates a latent feature matrix corresponding to the products, for example, as illustrated in FIG. 2B, and a latent feature matrix corresponding to the stores, for example, as illustrated in FIG. 2C. In the generation of the matrices, the system takes into account at least three factors that can cause inaccurate information. One factor is product bias. Product bias may be introduced, for example, when one product sells particularly well for reasons other than the product itself. For example, if a special promotion is carried where you can get two of the products for the price of one, the product may appear to sell very well because consumers are buying two of the products in order to take advantage of the promotion. As another example, a community event requiring particular attire may result in an increase in sales of a product fulfilling the attire requirements.

Another factor is store bias. Store bias may be introduced, for example, when one store has higher sales due to characteristics of the store. For example, stores located in particular geographical regions may have higher sales, stores located in convenient locations with respect to a large community of people may have higher sales, and the like. Another factor is within the matrix prediction itself. The predictions of each value within the matrix may have different confidence levels, referred to as variable prediction intervals. For example, some values may have tighter upper and lower bounds than other values within the matrix. The product and store bias factors can be learned in generating the product and store latent feature matrices. To overcome the problem of the variable prediction intervals of the matrix, the estimated errors are penalized according to the width of the confidence band within the matrices.

Once the two matrices of FIG. 2B and FIG. 2C are generated, the system treats these as product embeddings, corresponding to the product latent feature matrix, and store embeddings, corresponding to the store latent feature matrix. The system uses these embeddings to compute a dot vector between a given product and a given store. The dot vector identifies the expected demand of the given product if it were carried in the given store. In other words, the system generates a completed matrix from the product and store latent feature matrices while taking into account product and store bias and variable prediction intervals. Since a processor is utilized to create the matrices, the matrices are easily updatable and can be updated at desired intervals. For example, the matrices may be updated upon every season, at predetermined time intervals (e.g., every four weeks, every two months, every three days, etc.), upon receiving a trigger event (e.g., a new fashion catalog is introduced, a new fashion cycle, a season change, etc.), or whenever a user wants new matrices.

In the case that the product has no sales data, for example, the product is a brand new product, the system utilizes a deep learning model to predict a demand for the product. As with the matrix factorization, the prediction is made for a particular store, so the deep learning model is trained for the target store and different deep learning models will be used for different stores. Also, like the matrix factorization, the deep-learning model can be updated or retrained at desired intervals. The deep-learning model is trained utilizing historical data. The model identifies attributes or characteristics (e.g., color, fabric, pattern, elements or features, length, texture, etc.) of different products and then learns what attributes or characteristics cause a change in demand. In other words, the model is trained utilizing historical sales data that identifies how well a particular product sold. The model then identifies attributes of the products. Based upon sales data for different products and attributes of those products, the model can learn a correlation between an attribute and sales data.

The trained model can then be used to predict demand for a product having no historical sales data. The model is provided information regarding the new product, for example, an image, a text description, metadata, or the like. Using this information, the model identifies attributes of the new product and then, based upon the training data, can make a prediction regarding the demand for the new product. In an extremely simplified example, the model may learn that articles of clothing that include the color red sell very well at a particular store. Thus, a new product that includes the color red can be predicted to sell well at the same store. This is an extremely simplified example and the model is able to process much more information about the articles of clothing, attributes of the clothing, and correlation to sales data. Additionally, the model can take into account other attributes that may affect sales of a particular product, for example, store location, weather information, sales promotions, and the like, when predicting demand for a new product.

To calculate a sustainability score at 103, the system identifies the material composition of the product. The material composition is an identification of the materials that are included in the product, for example, cotton, polyester, metals, satin, and the like. Some products may be made of a single material, whereas other products are made of a blend of materials or include features (e.g., zippers, flowers, bows, strings, panels, etc.) that are made of different materials. The system identifies a sustainability score for each material within the material composition of the product. To identify the sustainability score the system may utilize a sustainability index, for example, a Higg Index, that identifies a sustainability score for different materials. The Higg Index provides a sustainability score by obtaining information related to various stages of manufacturing to result in the given material. For example, for cotton, the Higg Index may take into account the raw material source, yarn formation method, textile formation technique, preparation technique, coloration technique, and other information to produce an overall sustainability score for the cotton material.

Many fabrics are blended fabrics, meaning they are formed from more than one material. For example, a fabric may be 98% cotton and 2% elastic. Thus, to generate the sustainability score for the blended fabric, the system computes a weighted average of the sustainability scores for each of the materials within the fabric or material composition. Using the example above, the sustainability score for the cotton within the fabric would be given a weight of 0.98 and the sustainability score for the elastic would be given a weight of 0.02. These weights would then be used in generating the weighted average sustainability score for the material in the product. The Higg Index provides the sustainability score for a material based upon a weight of 1 Kg of the material. In other words, the sustainability score for a fabric of a particular material is based upon having 1 Kg of the fabric. Thus, the weighted average of the sustainability scores for each material within the material composition is normalized based upon the weight of the fabric. For example, if the material weighs half a kilogram, then the weighted average of the sustainability scores is normalized based upon this weight.

In computing the similarity score at 104, the system performs a pair-wise similarity calculation. In this pair-wise similarity calculation, pairs of products within the plurality of products are compared against each other. Each product is compared to the other products within the plurality. In other words, each product is part of multiple pairs in order to compute a similarity score for a single product. As an example, if the plurality of products includes three products, Product A, Product B, and Product C, the pairs necessary for computing the similarity score for Product A are Pair 1: Product A and Product B and Pair 2: Product A and Product C.

The actual comparison and computation of the similarity score may be performed utilizing a machine-learning model, for example, a recurrent neural network (RNN), convolutional neural network (CNN), or the like. The model generates a product embedding vector for the product. A RNN may be utilized to get an embedding from textual metadata, whereas a CNN may be utilized to get an embedding from images. Using the embedding vectors, the system utilizes a similarity measure, for example, cosine similarity, clustering techniques, affinity measurements, class distribution measures, or the like. Since each product is compared to the other products within the plurality, for each product, a plurality of similarity scores for a single product will be computed. The system may either average the similarity scores for a single product in order to generate an overall product similarity score, or may leave the plurality of similarity scores for a single product as separate scores. Leaving the scores as separate scores may be useful as different products may be included within an assortment, which would alter the overall similarity score for a product.

Once each of the products within the plurality of products has a corresponding demand value, a corresponding sustainability, and a corresponding one or more similarity scores, the system can determine if a plurality of assortment choices can be generated at 105. Each of the assortment choices includes a subset of the plurality of products that information was received for at 101. In other words, each of the assortment choices does not include all of the products identified in the catalog/database. If no assortment choices can be generated, the system may take no action at 106. Alternatively, the system may notify the user that an assortment choice cannot be generated.

If a plurality of assortment choices can be generated, the system may generate them at 107. Generating a plurality of assortment choices may include using a multi-objective formulation that is based upon the predicted demand for each of the plurality of products, the calculated sustainability for each of the plurality of products, and the computed similarity score for each of the plurality of products. The objective of the multi-objective formulation is to maximize return which is dependent on the demand values of the products, maximize sustainability which is dependent on the sustainability scores of the products, and maximize diversity or minimize similarity which is dependent on the similarity scores of the products. The answer to the multi-objective formulation is empty-hand which means that there is not a single answer to the formulation. An example of this formulation is as follows:

$$\max_{\|x\|_1 \leq k} \underbrace{\sum_i (\mu_i - \gamma \sigma_i) x_i}_{\text{Risk adjusted Return}} + \underbrace{\lambda \sum_i h_i x_i}_{\text{sustainability}} - \underbrace{\alpha \sum_{ij} s_{ij} x_i x_j}_{\text{similarity}}$$

where x_i is the binary variable indicating presence of product i in the assortment, μ_i is the forecasted mean demand for product i, σ_i is the standard error expected in the forecast, h_i is the sustainability score, s_ij is the similarity score, λ is the sustainability coefficient, which is the weight for the sustainability score, α is the similarity coefficient, which is the weight for the similarity score, and k is the desired assortment size.

There are multiple techniques for solving the formulation. One technique for solving the formulation is by creating a heap data structure. The formulation is solved for different values of λ and α. The proposed approach is a greedy based search of the heap structure to identify the product having the highest marginal gain. This product is selected and taken out of the heap, referred to as popping. The heap data structure is then re-heaped where the marginal gains of the remaining products are updated based upon the similarity and complementary to the selected product. The product in this reset heap data structure having the highest marginal gain is then popped. The process of re-heaping and popping products is iteratively performed until a desired number of products have been selected.

Another technique for solving the formulation is using an evolutionary approach, for example, NSGA-II. The evolutionary approach steadily converges a solution population to an optimal Pareto-front. A typical evolutionary approach has two goals. One goal is to converge a solution population to the Pareto-front. Another goal is to diversify the solution population to cover as much of the Pareto-front as possible. Thus, the Pareto-front has a set of solutions that is non-dominant and diverse. Optimal assortment choices are those assortment choices that lie on the Pareto-front. In either technique, multiple assortment choices are created that are optimal, meaning at least one of the objectives of the multi-objective formulation is maximized. Additionally, each of the assortments is a store-wise hyper-local assortment option, meaning that the assortment choices are optimized for the specific store that the assortment will be included within.

Each of the assortment choices has a corresponding assortment demand value, assortment sustainability score, and assortment similarity score. In other words, revenue, based on demand, sustainability, and diversity, based on similarity, are all quantified. To compute an assortment demand value, the system may take an average of the demand values for each of the products included in the assortment. To compute an assortment sustainability score, the system can compute an average of the sustainability scores of each of the products included in the assortment. To compute an assortment similarity score, the system may compute an average of the similarity scores of each of the products included in the assortment. Since a single product may have multiple similarity scores that are based upon the products included in the assortment, the system may first average the similarity scores of a product. Once all the products have an average similarity score, the system may then average the averaged product similarity scores to generate an assortment similarity score. Alternatively, the system may simply average all of the similarity scores for the products and across all the products. For example, instead of creating a product average similarity score, the system may include all the similarity scores of all the products to compute the assortment similarity score.

Once the assortment choices are generated, the assortment choices may be provided to a user at 108. The user can then select one of the assortment choices for inclusion within the retail store. In other words, the user can select one of the assortment choices, thereby selecting the products that will be included for sale in the retail store. In making a selection, the user may be provided with the assortment demand value, assortment sustainability score, and assortment similarity score for each assortment, thereby allowing the user to know the values for each assortment and select the assortment having a desired factor value.

Figure 3:
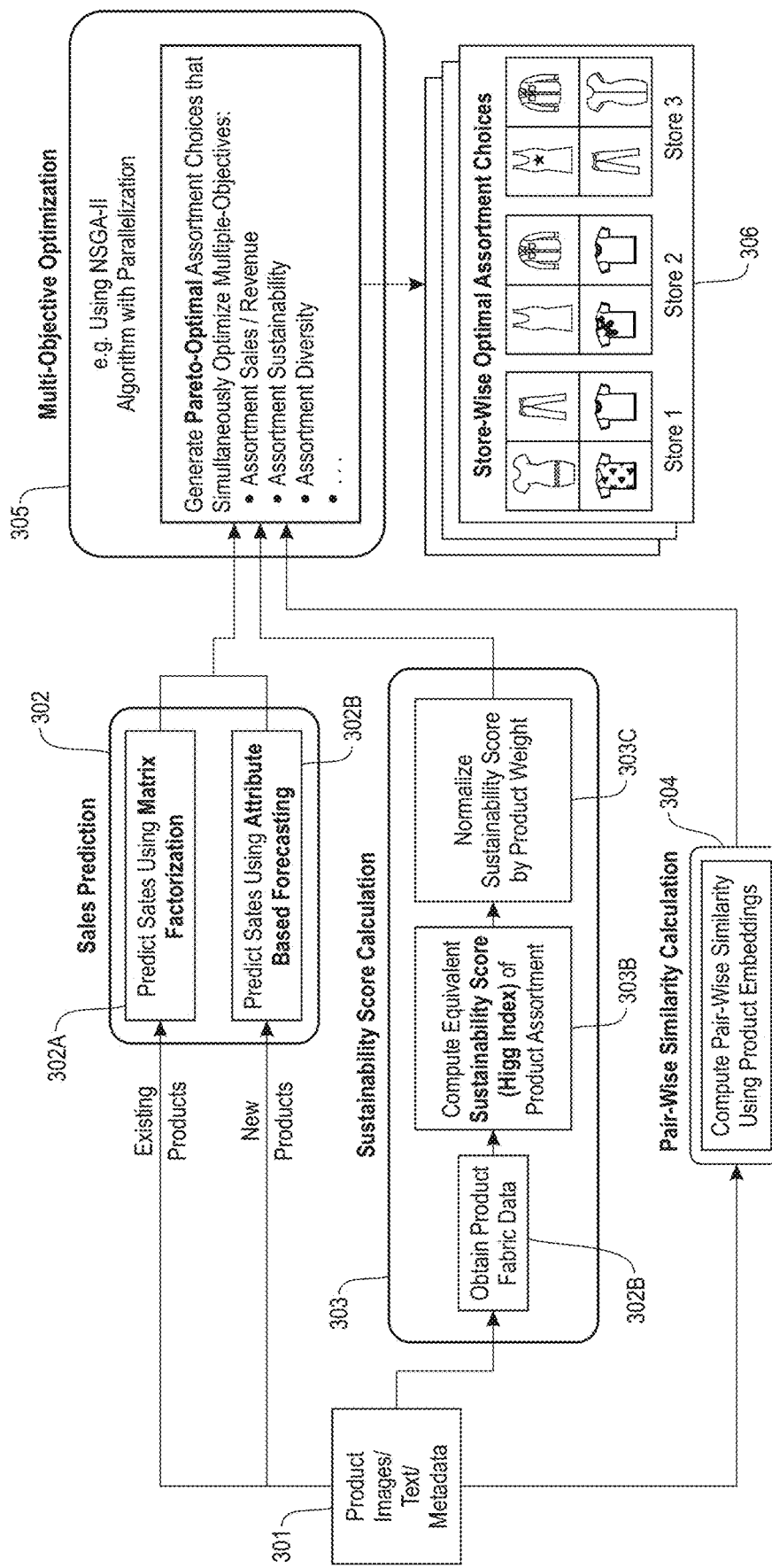
FIG. 3 illustrates an example system architecture for generating a plurality of assortments of products for possible sale in a retail store utilizing a multi-objective formulation based upon a demand, sustainability score, and similarity score for each of a plurality of products.

FIG. 3 illustrates an overall system architecture for the described system and method. The system receives product information, for example, images, text, metadata, or the like 301, for a plurality of products that can be included in a store for sale. The system predicts a demand or sales prediction 302 for each of the products in the plurality. For products that have some existing historical sales data, the system predicts sales for the product using matrix factorization 302A. For products that have no historical sales data, also referred to as new products, the system predicts sales using attribute-based forecasting 302B which utilizes a machine-learning model that is unique to the particular store that the product will be sold within.

The system also computes a sustainability score for each product using a sustainability score calculation 303. To perform this calculation, the system obtains the fabric data for the product 303A. The system then computes the equivalent sustainability score of the product 303B. This can be computed using a sustainability index, for example, the Higg Index. The system then normalizes the sustainability score by the product weight 303C. The system also calculates a similarity score for each product using a pair-wise similarity calculation 304. To perform this calculation the system computes pair-wise similarity using product embeddings.

Using the sales predictions 302, sustainability scores 303, and similarity calculations 304, the system performs a multi-objective optimization 305. One technique for solving the multi-objective formulation is to use an evolutionary approach, for example, a NSGA-II algorithm with parallelization to generate a Pareto-front having Pareto-optimal assortment choices. This approach simultaneously optimizes multiple objectives, for example, assortment sales/revenue, assortment sustainability, and assortment diversity. The output of the multi-objective optimization 305 is a plurality of store-wise optimal assortment choices 306 that are unique to and targeted for a target retail store.

Thus, the described systems and methods represent a technical improvement over current systems for selecting products for sale in a retail store. The described system and method allows companies to be more sustainable while not increasing costs. In other words, the system determines which products should be included in a retail store that will sell well and will not be wasted, thereby maximizing revenue while minimizing the environmental impact. The assortment choices are specialized to the demand of the consumers that are living around the retail store, is diverse, and is sustainable. Thus, the described system provides a technique that allows for increasing sustainability in the fashion industry which is not possible using conventional techniques.

Figure 4:
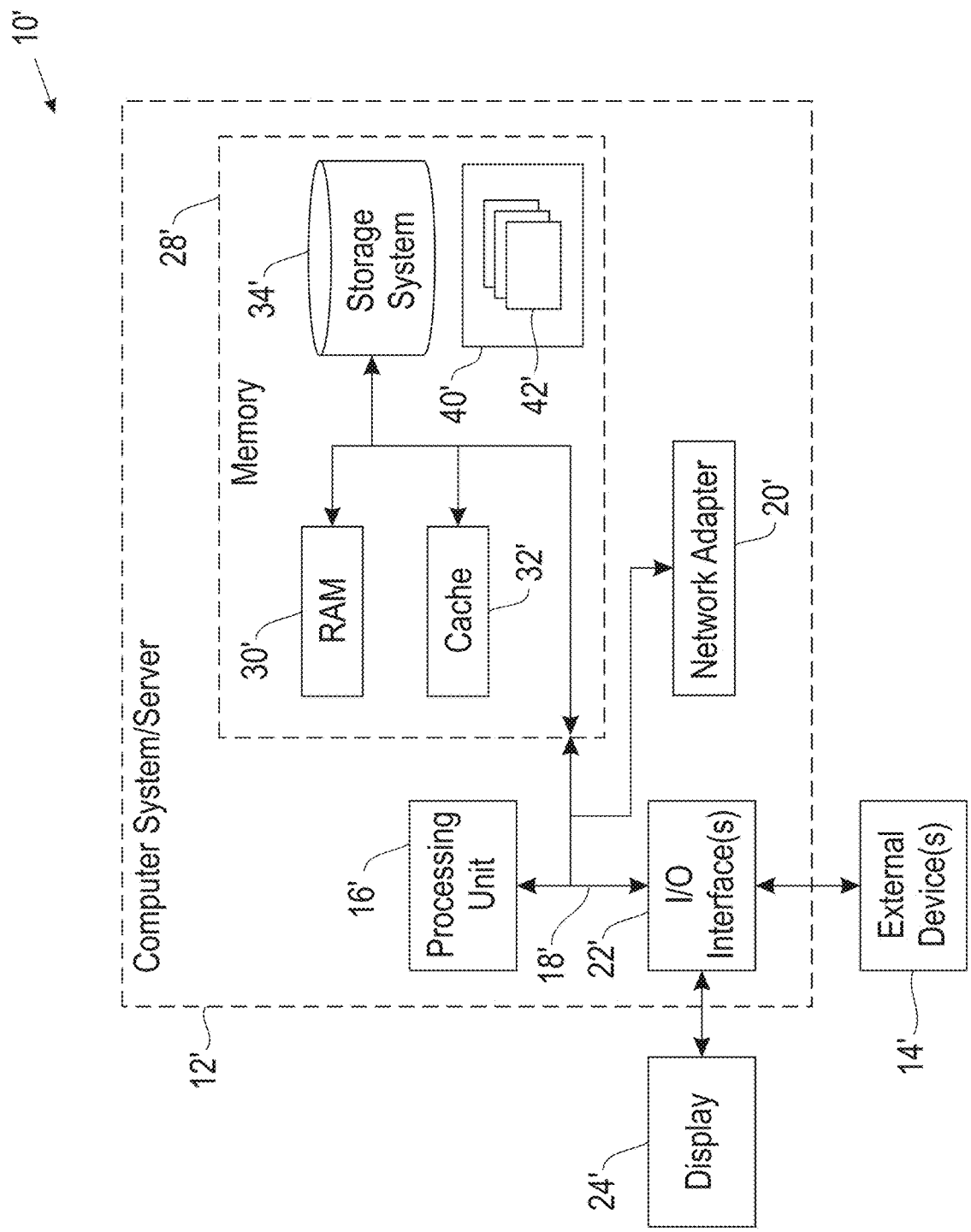
FIG. 4 illustrates a computer system.

As shown in FIG. 4, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
receiving, at a product prediction computing device, information for each of a plurality of products for possible sale at a retail store of a plurality of retail stores;
for each of the plurality of products:
predicting, using a deep-learning model unique to the retail store by being trained utilizing information of the retail store, a demand for a given product of the plurality of products when included within the retail store for sale and unique to the retail store by determining whether the given product of the plurality of products has historical sales information, wherein the deep-learning model predicts demand for products having historical sales information and also for products having no historical sales information, wherein the deep-learning model is trained based upon attributes of the products having historical sales information, historical sales data of the products having historical sales information, and the information of the retail store for which the deep-learning model is trained, wherein the deep-learning model learns correlations between the attributes of the products having historical sales information and the historical sales data of the products having historical sales information to predict the demand for the given product of the plurality of products within the retail store based upon attributes of the given product of the plurality of products, wherein the deep-learning model is retrained based upon the historical sales data of the products having historical sales information in view of previous predictions of the deep-learning model, wherein each retail store of the plurality of retail stores has a unique associated deep-learning model trained for a given retail store;
calculating, using the product prediction computing device, a sustainability score, wherein the sustainability score is based upon a material composition of the given product of the plurality of products;
and computing, using the product prediction computing device, a similarity score by performing a pair-wise similarity calculation comprising comparing pairs of products within the plurality of products, wherein one of the products within each of the pairs is the given product of the plurality of products, wherein the similarity score for the given product of the plurality of products comprises performing the pair-wise similarity calculation for the given product of the plurality of products against each other product of the plurality of products, wherein the similarity score for the given product of the plurality of products comprises a plurality of similarity scores, each corresponding to one of the pair-wise similarity calculations including the given product of the plurality of products;
generating, using the product prediction computing device and utilizing a multi-objective formulation, a plurality of assortment choices from the plurality of products, wherein each of the plurality of assortment choices comprises a subset of the plurality of products and has a corresponding assortment demand value computed using the multi-objective formulation from the predicted demand for each of the plurality of products within a given assortment choice of the plurality of assortment choices, assortment sustainability score computed using the multi-objective formulation from the calculated sustainability score for each of the plurality of products within the given assortment choice of the plurality of assortment choices, and assortment similarity score computed using the multi-objective formulation from the computed similarity score for each of the plurality of products within the given assortment choice of the plurality of assortment choices;
and providing, using the product prediction computing device, the plurality of assortment choices to a user for selection of one of the plurality of assortment choices to be included within the retail store for sale.

2. The method of claim 1, wherein the given product of the plurality of products comprises a product having historical sales information from at least one other retail store of the plurality of retail stores;
and wherein the predicting the demand comprises estimating, utilizing matrix factorization, the demand for the given product of the plurality of products within the retail store based upon the demand for the given product of the plurality of products in the at least one retail store of the plurality of retail stores.

3. The method of claim 2, wherein the matrix factorization is performed taking into account product bias, store bias, and confidence levels within the matrix by utilizing a product embedding, corresponding to a product latent feature matrix generated from a matrix defined from the matrix factorization, and a store embedding, corresponding to a store latent feature matrix generated from a second matrix defined form the matrix factorization, to define a dot vector between the given product of the plurality of products and the retail store.

4. The method of claim 1, wherein the calculating a sustainability score comprises identifying a sustainability score for each material within the material composition of the given product of the plurality of products and computing a weighted average of the sustainability scores for each material within the material composition.

5. The method of claim 4, wherein the calculating the sustainability score comprises normalizing the weighted average of the sustainability scores for each material within the material composition based upon a weight of the material.

6. The method of claim 1, wherein the computing the similarity score comprises generating a product embedding vector for the given product of the plurality of products utilizing the deep-learning model and computing, utilizing a similarity measure, a plurality of similarity scores for the pairs of products.

7. The method of claim 1, wherein the generating the plurality of assortment choices comprises solving the multi-objective formulation by creating a heap data structure based upon marginal gain of each of the plurality of products, selecting a product of the plurality of products having the highest marginal gain, and iteratively resetting the heap data structure and selecting a product of the plurality of products having the highest marginal gain in the reset heap data structure until a predetermined number of products is selected.

8. The method of claim 1, wherein the generating the plurality of assortment choices comprises solving the multi-objective formulation by creating a pareto-front, wherein each of the plurality of assortment choices lies on the pareto-front.

9. The method of claim 1, wherein objectives of the multi-objective formulation comprise maximizing return identified from the predicted demand for each product of the plurality of products, maximizing sustainability identified from the calculated sustainability score for each product of the plurality of products, and maximize diversity identified from the computed similarity score for each product of the plurality of products.

10. An apparatus, comprising:
   at least one processor;
   and a computer readable storage medium having computer readable program code embodied therewith and executable by the at least one processor, the computer readable program code comprising:
   computer readable program code configured to receive, at a product prediction system, information for each of a plurality of products for possible sale at a retail store of a plurality of retail stores;
   for each of the plurality of products:
      computer readable program code configured to predict, using a deep-learning model unique to the retail store by being trained utilizing information of the retail store, a demand for a given product of the plurality of products if included within the retail store for sale and unique to the retail store by determining whether the given product of the plurality of products has historical sales information, wherein the deep-learning model predicts demand for products having historical sales information and also for products having no historical sales information, wherein the deep-learning model is trained based upon attributes of the products having historical sales information, historical sales data of the products having historical sales information, and the information of the retail store for which the deep-learning model is trained, wherein the deep-learning model learns correlations between the attributes of the products having historical sales information and the historical sales data of the products having historical sales information to predict the demand for the given product of the plurality of products within the retail store based upon attributes of the given product of the plurality of products, wherein the deep-learning model is retrained based upon the historical sales data of the products having historical sales information in view of previous predictions of the deep-learning model, wherein each retail store has a unique associated deep-learning model trained for a given retail store of the plurality of retail stores;
      computer readable program code configured to calculate, using the product prediction system, a sustainability score, wherein the sustainability score is based upon a material composition of the given product of the plurality of products; and
      computer readable program code configured to compute, using the product prediction system, a similarity score by performing a pair-wise similarity calculation comprising comparing pairs of products within the plurality of products, wherein one of the products within each of the pairs is the given product of the plurality of products, wherein the similarity score for the given product of the plurality of products comprises performing the pair-wise similarity calculation for the given product of the plurality of products against each other product of the plurality of products, wherein the similarity score for the given product of the plurality of products comprises a plurality of similarity scores, each corresponding to one of the pair-wise similarity calculations including the given product of the plurality of products;
   computer readable program code configured to generate, using the product prediction system and utilizing a multi-objective formulation, a plurality of assortment choices from the plurality of products, wherein each of the plurality of assortment choices comprises a subset of the plurality of products and has a corresponding assortment demand value computed using the multi-objective formulation from the predicted demand for each of the plurality of products within a given assortment choice of the plurality of assortment choices, assortment sustainability score computed using the multi-objective formulation from the calculated sustainability score for each of the plurality of products within the given assortment choice of the plurality of assortment choices, and assortment similarity score computed using the multi-objective formulation from the computed similarity score for each of the plurality of products within the given assortment choice of the plurality of assortment choices; and
   computer readable program code configured to provide, using the product prediction system, the plurality of assortment choices to a user for selection of one of the plurality of assortment choices to be included within the retail store for sale.

11. A computer program product, comprising:
   a computer readable storage medium having computer readable program code embodied therewith, the computer readable program code executable by a processor and comprising:
   computer readable program code configured to receive, at a product prediction system, information for each of a plurality of products for possible sale at a retail store of a plurality of retail stores;
   for each of the plurality of products:
      computer readable program code configured to predict, using a deep-learning model unique to the retail store by being trained utilizing information of the retail store, a demand for a given product of the plurality of products if included within the retail store for sale and unique to the retail store by determining whether the given product of the plurality of products has historical sales information, wherein the deep-learning model predicts demand for products having historical sales information and also for products having no historical sales information, wherein the deep-learning model is trained based upon attributes of the products having historical sales information, historical sales data of the products having historical sales information, and the information of the retail store for which the deep-learning model is trained, wherein the deep-learning model learns correlations between the attributes of the products having historical sales information and the historical sales data of the products having historical sales information to predict the demand for the given product of the plurality of products within the retail store based upon attributes of the given product of the plurality of products, wherein the deep-learning model is retrained based upon the historical sales data of the products having historical sales information in view of previous predictions of the deep-learning model, wherein each retail store has a unique associated deep-learning model trained for a given retail store of the plurality of retail stores;

computer readable program code configured to calculate, using the product prediction system, a sustainability score, wherein the sustainability score is based upon a material composition of the given product of the plurality of products;

and computer readable program code configured to compute, using the product prediction system, a similarity score by performing a pair-wise similarity calculation comprising comparing pairs of products within the plurality of products, wherein one of the products within each of the pairs is the given product of the plurality of products, wherein the similarity score for the given product of the plurality of products comprises performing the pair-wise similarity calculation for the given product of the plurality of products against each other product of the plurality of products, wherein the similarity score for the given product of the plurality of products comprises a plurality of similarity scores, each corresponding to one of the pair-wise similarity calculations including the given product of the plurality of products;

computer readable program code configured to generate, using the product prediction system and utilizing a multi-objective formulation, a plurality of assortment choices from the plurality of products, wherein each of the plurality of assortment choices comprises a subset of the plurality of products and has a corresponding assortment demand value computed using the multi-objective formulation from the predicted demand for each of the plurality of products within a given assortment choice of the plurality of assortment choices, assortment sustainability score computed using the multi-objective formulation from the calculated sustainability score for each of the plurality of products within the given assortment choice of the plurality of assortment choices, and assortment similarity score computed using the multi-objective formulation from the computed similarity score for each of the plurality of products within the given assortment choice of the plurality of assortment choices;

and computer readable program code configured to provide, using the product prediction system, the plurality of assortment choices to a user for selection of one of the plurality of assortment choices to be included within the retail store for sale.

12. The computer program product of claim 11, wherein the given product of the plurality of products comprises a product having historical sales information from at least one other retail store of the plurality of retail stores; and wherein the predicting the demand comprises estimating, utilizing matrix factorization, the demand for the given product of the plurality of products within the retail store based upon the demand for the given product of the plurality of products in the at least one retail store of the plurality of retail stores.

13. The computer program product of claim 12, wherein the matrix factorization is performed taking into account product bias, store bias, and confidence levels within the matrix by utilizing a product embedding, corresponding to a product latent feature matrix generated from a matrix defined from the matrix factorization, and a store embedding, corresponding to a store latent feature matrix generated from a second matrix defined form the matrix factorization, to define a dot vector between the given product of the plurality of products and the retail store.

14. The computer program product of claim 11, wherein the calculating a sustainability score comprises identifying a sustainability score for each material within the material composition of the given product of the plurality of products and computing a weighted average of the sustainability scores for each material within the material composition.

15. The computer program product of claim 14, wherein the calculating the sustainability score comprises normalizing the weighted average of the sustainability scores for each material within the material composition based upon a weight of the material.

16. The computer program product of claim 11, wherein the computing the similarity score comprises generating a product embedding vector for the given product of the plurality of products utilizing the deep-learning model and computing, utilizing a similarity measure, a plurality of similarity scores for the pairs of products.

17. The computer program product of claim 11, wherein the generating the plurality of assortment choices comprises solving the multi-objective formulation by creating a heap data structure based upon marginal gain of each of the plurality of products, selecting a product of the plurality of products having the highest marginal gain, and iteratively resetting the heap data structure and selecting a product of the plurality of products having the highest marginal gain in the reset heap data structure until a predetermined number of products is selected.

18. The computer program product of claim 11, wherein the generating the plurality of assortment choices comprises solving the multi-objective formulation by creating a pareto-front, wherein each of the plurality of assortment choices lies on the pareto-front.

* * * * *